(12) United States Patent
Shaflik et al.

(10) Patent No.: US 11,584,548 B2
(45) Date of Patent: Feb. 21, 2023

(54) DYNAMIC FAULT ISOLATION FOR AIRCRAFT

(71) Applicant: THE BOEING COMPANY, Chicago, IL (US)

(72) Inventors: Brian Shaflik, Brier, WA (US); Richard Jon Reuter, Seattle, WA (US); Michael Anderegg, Mill Creek, WA (US); Ronald B. Murray, Stanwood, WA (US); John Scott Elliot, Edmonds, WA (US)

(73) Assignee: THE BOEING COMPANY, Arlington, VA (US)

( * ) Notice: Subject to any disclaimer, the term of this patent is extended or adjusted under 35 U.S.C. 154(b) by 401 days.

(21) Appl. No.: 16/821,292

(22) Filed: Mar. 17, 2020

(65) Prior Publication Data

US 2021/0292008 A1 Sep. 23, 2021

(51) Int. Cl.
*B64F 5/60* (2017.01)
*B64D 45/00* (2006.01)
*G06N 5/04* (2006.01)

(52) U.S. Cl.
CPC .............. *B64F 5/60* (2017.01); *B64D 45/00* (2013.01); *G06N 5/04* (2013.01); *B64D 2045/0085* (2013.01)

(58) Field of Classification Search
CPC ... B64F 5/60; B64F 5/40; B64D 45/00; B64D 2045/0085; G06N 5/04; G06Q 10/20
See application file for complete search history.

(56) References Cited

U.S. PATENT DOCUMENTS

| 6,003,808 A | 12/1999 | Nguyen et al. |
| 6,262,720 B1 | 7/2001 | Jeffrey et al. |
| 8,744,668 B2 * | 6/2014 | Selkirk ................ G07C 5/0808 340/439 |

(Continued)

FOREIGN PATENT DOCUMENTS

CN 1688479 A * 10/2005 ............ B64F 5/0045

OTHER PUBLICATIONS

Extended European Search Report for application No. 21163275.7 dated Aug. 13, 2021, pp. 1-7.

(Continued)

*Primary Examiner* — Quan Zhen Wang
*Assistant Examiner* — Mancil Littlejohn, Jr.
(74) *Attorney, Agent, or Firm* — Moore IP Law

(57) ABSTRACT

A method includes receiving fault code data identifying one or more fault conditions detected onboard an aircraft and receiving fault context data indicating one or more conditions of the aircraft in a timeframe associated with the condition(s). The method also includes generating (based on the fault code data, the fault context data, state data indicating a current state of the aircraft, and historical maintenance data) a first checklist display including a first set of incomplete checklist items. The method further includes receiving input indicating completion of one or more checklist items of the first set of incomplete checklist items and updating the state data based on the input. The method also includes generating (based on the fault code data, the fault context data, the updated state data, and historical maintenance data) a second checklist display including a second set of incomplete checklist items.

20 Claims, 7 Drawing Sheets

(56) References Cited

U.S. PATENT DOCUMENTS

| | | | | |
|---|---|---|---|---|
| 8,983,687 | B1* | 3/2015 | Hunter | G08G 5/0021 |
| | | | | 701/16 |
| 9,002,571 | B1 | 4/2015 | Gribble et al. | |
| 9,809,323 | B2* | 11/2017 | Narra | B64D 45/00 |
| 10,466,865 | B2 | 11/2019 | Downs et al. | |
| 10,839,624 | B2* | 11/2020 | Huang | G06F 16/288 |
| 2010/0312420 | A1* | 12/2010 | Sham | G06Q 10/00 |
| | | | | 701/3 |
| 2013/0138467 | A1* | 5/2013 | Small | G06Q 10/06 |
| | | | | 705/7.26 |
| 2018/0292953 | A1 | 10/2018 | Pandya et al. | |

OTHER PUBLICATIONS

Subramanyam, Rajesh, et al., "Automated Preflight Smart Inspection Tool," IP.com, Inc., Oct. 12, 2016, pp. 1-7.

\* cited by examiner

DYNAMIC FAULT ISOLATION FOR AIRCRAFT

FIELD OF THE DISCLOSURE

The present disclosure is related to aircraft maintenance using dynamic fault isolation processes.

BACKGROUND

As aircraft become more complex, it is increasingly difficult and time consuming to maintain them. Many modern aircraft include aircraft health monitoring systems to detect fault conditions and assist maintenance personnel with identifying and troubleshooting the fault condition. For example, in response to detecting a particular fault condition, an aircraft health monitoring system may generate a fault code. The fault code may be indexed to a fault isolation process in a fault isolation manual associated with the aircraft. The fault isolation process lists a series of tasks that should be performed by maintenance personnel to isolate and correct the fault condition. Different detected fault conditions are indexed to respective fault isolation procedures. Each fault isolation procedure specifies a sequence of tasks that should be performed. The sequence of tasks is ordered based on some predetermined criteria, such as how likelihood that each task will resolve the fault condition.

SUMMARY

According to a particular aspect, an aircraft maintenance system includes one or more data bus interfaces, one or more processors coupled to the one or more data bus interfaces, and one or more memory devices accessible by the one or more processors. The one or more data bus interfaces are configured to receive fault code data and fault context data via one or more aircraft data buses. The fault code data identifies one or more fault conditions detected onboard an aircraft, and the fault context data indicates one or more conditions of the aircraft in a timeframe associated with the one or more fault conditions. The one or more memory devices store instructions that are executable by the one or more processors to cause the one or more processors to generate a first checklist display including a first set of incomplete checklist items. The first checklist display is generated based on the fault code data, the fault context data, state data indicating a current state of the aircraft, and historical maintenance data. The instructions are further executable by the one or more processors to cause the one or more processors to receive input indicating completion of one or more checklist items of the first set of incomplete checklist items and to update the state data based on the input. The instructions are further executable by the one or more processors to cause the one or more processors to generate a second checklist display including a second set of incomplete checklist items. The second checklist display is generated based on the fault code data, the fault context data, the updated state data, and the historical maintenance data, and the second set of incomplete checklist items is different from the first set of incomplete checklist items.

According to another aspect, a method includes receiving fault code data via one or more aircraft data buses, where the fault code data identifies one or more fault conditions detected onboard an aircraft. The method also includes receiving fault context data via the one or more aircraft data buses, where fault context data indicates one or more conditions of the aircraft in a timeframe associated with the one or more fault conditions. The method further includes generating, by one or more processors, a first checklist display including a first set of incomplete checklist items. The first checklist display is generated based on the fault code data, the fault context data, state data indicating a current state of the aircraft, and historical maintenance data. The method also includes receiving, by the one or more processors, input indicating completion of one or more checklist items of the first set of incomplete checklist items and updating, by the one or more processors, the state data based on the input. The method further includes generating, by the one or more processors, a second checklist display including a second set of incomplete checklist items. The second checklist display is generated based on the fault code data, the fault context data, the updated state data, and historical maintenance data, and the second set of incomplete checklist items is different from the first set of incomplete checklist items.

According to another aspect, a computer-readable storage device stores instructions that are executable by one or more processors to cause the one or more processors to perform operations. The operations include receiving fault code data identifying one or more fault conditions detected onboard an aircraft and receiving fault context data indicating one or more conditions of the aircraft in a timeframe associated with the one or more fault conditions. The operations also include generating a first checklist display including a first set of incomplete checklist items, where the first checklist display is generated based on the fault code data, the fault context data, state data indicating a current state of the aircraft, and historical maintenance data. The operations further include receiving input indicating completion of one or more checklist items of the first set of incomplete checklist items and updating the state data based on the input. The operations further include generating a second checklist display including a second set of incomplete checklist items. The second checklist display is generated based on the fault code data, the fault context data, the updated state data, and historical maintenance data, and the second set of incomplete checklist items is different from the first set of incomplete checklist items.

The features, functions, and advantages described herein can be achieved independently in various implementations or may be combined in yet other implementations, further details of which can be found with reference to the following description and drawings.

DETAILED DESCRIPTION

Figure 1:
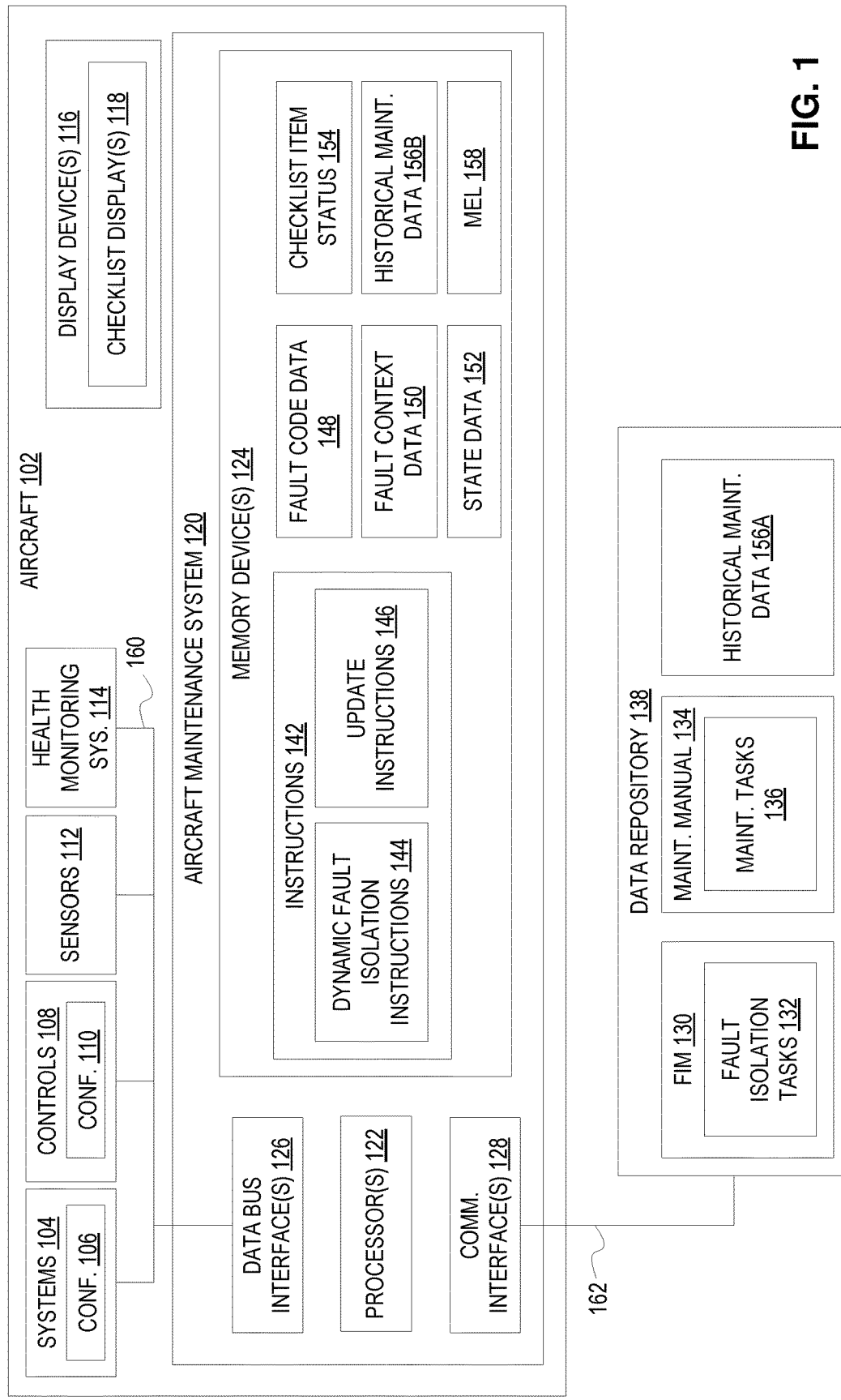
FIG. 1 is a block diagram that illustrates a system including an aircraft and an associated aircraft maintenance system that facilitates dynamic fault isolation.

In a particular implementation, a context-sensitive aircraft maintenance system uses data descriptive of a fault, context information, state data, and historical data to make recommendations regarding which procedure to perform and/or an order (e.g., sequence) in which tasks should be performed to identify and/or correct a fault condition. The context information includes information about the aircraft from a time period during which the fault occurred or was detected. In some implementations, the context information also includes current state or configuration information related to the aircraft, such as settings of various controls (e.g., selector switch position, valve position, circuit breaker state, etc.), control surface positions, other system parameters, etc.

The order of the tasks is determined, in part, based on which tasks solved prior complaints associated with the same or related fault codes and the same or similar context information. The order is determined dynamically (e.g., at runtime). Thus, over time as additional historical data is accumulated, the order of the tasks for a particular fault isolation checklist changes.

In some implementations, the fault isolation checklist is controlled by a component that has access to the current state of the aircraft and memory indicating prior operations performed during a particular maintenance activity. In such implementations, the fault isolation checklist can be automatically updated to indicate that a particular step or operation was previously performed or is not needed during the particular maintenance activity. For example, some fault isolation tasks of a fault isolation checklist refer to maintenance processes that includes multiple tasks. In this example, each maintenance process is reasonably comprehensive, in that it explicitly or implicitly lists all of the tasks needed to perform the maintenance process. Many such steps overlap from one maintenance process to another maintenance process. To illustrate, a maintenance task related to a particular subsystem may include a task for removing an access panel to gain access to a component of the particular subsystem. If several components of the subsystem are disposed beneath the access panel, the user may subsequently perform another maintenance task process that also lists a maintenance task of removing the access panel. In this situation, the fault isolation checklist can automatically indicate that the task of removing the access panel as complete based on the access panel having been removed during the prior maintenance task. Additionally, or in the alternative, two or more tasks may be listed adjacent to one another in the fault isolation checklist due, in part, to the fact that each of the two or more tasks requires removal of the access panel thereby reducing time required for ancillary tasks (e.g., tasks that are not by themselves intended to correct the fault condition).

In another example, a particular fault isolation process described by a fault isolation checklist may include a task of setting a control input to a particular state, such as turning a knob, flipping a switch, opening a breaker, etc. In this example, the task can be automatically indicated as complete based on detecting the state of the control input (e.g., based on data read from an aircraft data bus, based on sensor data, and/or based on data stored in a memory indicating the state of the control input).

Each fault isolation checklist describes a process including a plurality of tasks. Each fault isolation checklist is associated with (e.g., indexed to) one or more fault codes, and each fault code is associated with (e.g., indexed to) one or more fault isolation checklists. In some implementations, an order of the tasks of a fault isolation checklist is determined based at least in part on the context information and historical maintenance information. As a result, tasks that have historically resulted in resolution of the fault condition, based on the fault code and the context information, may be performed earlier in the maintenance activities. One technical benefit of the dynamic fault isolation process describe herein is decreased downtime (or conversely increased availability) of aircraft because the dynamic ordering of the fault isolation tasks results in performing operations that are likely to resolve the fault condition earlier in the maintenance process. This benefit is cumulative since the order changes as more historical information becomes available.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple instances of historical maintenance data are illustrated and associated with reference numbers 156A and 156B. When referring to a particular one of these instances of historical maintenance data, such as the historical maintenance data 156A, the distinguishing letter "A" is used. However, when referring to any arbitrary instance of historical maintenance data or to these instances of historical maintenance data as a group, the reference number 156 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Moreover, terms such as "includes," "including," "has," "contains," and variants thereof used herein, are intended to be inclusive in a manner similar to the term "comprises" as an open transition word without precluding any additional or other elements. Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first, " "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, a "fault condition" refers to any detected or detectable abnormality in the aircraft. Typically, fault conditions are associated with fault codes which describe the systems or subsystems affected. Fault conditions (or fault codes) may also be associated with text summaries that provide more readily understandable (relative to fault codes) information about the fault condition.

As used herein, "state data" refers to any data indicative of a current state of the aircraft, such as sensor data, stored values in memory, data bus signals, etc. In this context, the current state of the aircraft includes whether particular components are present or not, whether particular components are active or not, positions of components (e.g., flight control surfaces, switches, etc.), results of function tests, etc. In this context, configuration data is a subset of state data. The configuration data indicates specific settings or positions of aircraft components at a particular time. For example, the configuration data associated with a fault condition may indicate whether flaps of the aircraft were deployed with the fault condition was detected.

As used herein, "historical maintenance data" refers to a record associated with a particular aircraft or with multiple aircraft (e.g., all of the aircraft of a fleet). The historical maintenance data identifies aircraft complaints (e.g., fault codes or crew reported complaints) and maintenance tasks that were performed. In some implementations, the historical maintenance data also identifies context information associated with some or all of the aircraft complaints, an order in which the maintenance tasks were performed, and some indication of which maintenance task(s) resolved the complaint.

FIG. 1 is a block diagram that illustrates a system 100 including an aircraft 102 and an associated aircraft maintenance system 120. In FIG. 1, the system 100 also includes a data repository 138 that is coupled to or accessible to the aircraft maintenance system 120. In FIG. 1, the data repository 138 is offboard the aircraft 102. In other implementations, the data repository 138 or portions thereof is onboard the aircraft 102. Further, in FIG. 1, the aircraft maintenance system 120 is onboard the aircraft 102; however, in other implementations, the aircraft maintenance system 120 is offboard the aircraft 102.

In FIG. 1, the aircraft 102 includes multiple systems 104. The systems 104 includes any component, line replaceable unit (LRU), or bus of the aircraft 102. Each of the systems 104 has a corresponding configuration 106, which refers to a state of each of the systems 104. The aircraft 102 also includes controls 108, each of which has a corresponding configuration 110. The controls 108 include automatic controls and user selectable controls. Examples of automatic controls include control circuits and processors that generate control signals based on sensed data or other information. Examples of user selectable controls include switches, dials, knobs, touchscreen interfaces, buttons, etc.

The aircraft 102 further includes sensors 112. The sensors 112 are configured to generate sensor data, such as data indicating the configuration 106 of one or more of the system 104, the configuration 110 of one or more of the controls 108, or other information about the operation or state of the aircraft 102 or its surroundings.

The aircraft 102 also includes a health monitoring system 114. The health monitoring system 114 is configured to detect fault conditions within the aircraft 102. For example, the health monitoring system 114 can receive the sensor data, configuration data descriptive of the configuration 106 of one or more of the systems 104, configuration data descriptive of the configuration 110 of one or more of the controls 108, other data, or any combination thereof, via one or more aircraft data buses 160 and compare the data to various fault detection criteria (e.g., thresholds, patterns, etc.) to determine when a fault condition is present. Responsive to detecting a fault condition, the health monitoring system 114 generates data descriptive of the fault condition, such as a fault code or a similar fault indication. Although FIG. 1 shows the health monitoring system 114 as a distinct component, in some implementations, the health monitoring system 114, or portions thereof, is distributed among the systems 104 that are monitored. For example, an electrical system of the system 104 can include an electrical system controller or an electrical system monitor that performs electrical system-specific health monitoring.

The aircraft maintenance system 120 includes one or more data bus interfaces 126 to receive data via the aircraft data bus(es) 160. For example, in a particular implementation, the data bus interface(s) 126 receive fault code data 148 from the health monitoring system 114 via the aircraft data bus(es) 160. The fault code data 148 identifies one or more fault conditions detected onboard an aircraft. In some implementations, the data bus interface(s) 126 also receive fault context data 150 via the aircraft data bus(es) 160. The fault context data 150 indicates one or more conditions of the aircraft 102 in a timeframe associated with the one or more fault conditions (e.g., a period before or simultaneous with detection of the one or more fault conditions). In a particular example, the fault context data 150 includes sensor data from the sensors 112 indicating an operational environment associated with the aircraft 102 during the timeframe associated with the fault condition(s), configuration data indicating a state (e.g., describes one or more of the configurations 106 or 110) of the aircraft 102 during the timeframe, or both.

The aircraft maintenance system 120 includes one or more processors 122 coupled to the data bus interface(s) 126 and one or more memory devices 124 accessible to the processor(s) 122. In a particular implementation, the aircraft maintenance system 120 enables a computer system to operate as a special purpose computer system that supports dynamic fault isolation for aircraft maintenance. In FIG. 1, the aircraft maintenance system 120 also includes one or more communication interfaces 128 configured to facilitate offboard communication. For example, when the data repository 138 is located offboard the aircraft, the communication interface(s) 128 can access data from the data repository 138 via an offboard communication connection 162, which can include a wired or wireless connection.

The memory device(s) 124 store data and instructions 142 that are executable by the processor(s) 122 to perform various operations. In FIG. 1, the data includes the fault code data 148 and the fault context data 150. In some implementations, the memory device(s) 124 also stores state data 152 which indicates a current state of the aircraft 102. For example, the state data 152 indicates one or more configuration states (e.g., describes one or more of the configurations 106 or 110) of the aircraft 102 in real-time or near real-time.

In the example illustrated in FIG. 1, the memory device(s) 124 also stores historical maintenance data 156B. In some implementations, the memory device(s) 124 stores a portion of the historical maintenance data 156B, and the data repository 138 stores another portion of the historical maintenance data 156A. The historical maintenance data 156 identifies prior maintenance activity associated with the aircraft 102, associated with one or more other aircraft (e.g., other similar aircraft), or associated with both. The prior maintenance activity indicates a plurality of historical fault conditions, historical fault context data associated with each of the historical fault conditions, a respective ordered sequence of tasks performed to resolve each of the historical fault conditions.

In FIG. 1, the instructions 142 include dynamic fault isolation instructions 144 and update instructions 146. The dynamic fault isolation instructions 144 are executable by the processor(s) 122 to generate checklist display(s) 118 to guide maintenance personnel through a fault isolation process and related maintenance processes. In FIG. 1, the checklist display(s) 118 are shown as presented via one or more display devices 116 onboard the aircraft 102; however, in other implementations, the checklist display(s) 118 are presented via a display device that is offboard the aircraft 102 or a portable display device, such as an electronic maintenance manual device.

The checklist display(s) 118 lists an ordered sequence of fault isolation tasks 132 based on a fault isolation manual (FIM) 130, an ordered sequence of maintenance tasks 136 based on a maintenance manual 134, or both. The set of tasks and the order of the tasks presented in the checklist display(s) 118 is determined (e.g., by the processor(s) 122) based on the fault code data 148, the fault context data 150, the state data 152, the historical maintenance data 156, the FIM 130, the maintenance manual 134, a minimum equipment list (MEL) 158, or combinations thereof, as described further below. The FIM 130 maps each fault code to a particular fault isolation process, and each fault isolation process indicates a set of fault isolation tasks 132, some of which may be maintenance tasks 136. To illustrate, the fault code data is associated with (e.g., indexed to or mapped to) multiple fault isolation paths of the FIM 130, and each fault isolation path specifies a sequence of tasks to isolate a cause of a particular fault condition of the one or more fault conditions.

In some implementations, a particular checklist display 118 lists the set of the fault isolation tasks 132 (and maintenance tasks 136) that are associated with a particular detected fault code and the order of tasks in the list is determined (e.g., by the processor(s) 122) based on the historical maintenance data 156 (alone or in combination with other data). To illustrate, the fault context data 150 can be evaluated along with the historical maintenance data 156 to determine which tasks are more likely to resolve the fault condition based on which tasks resolved similar fault conditions (e.g., fault conditions associated with the same or related fault codes and the same or similar fault contexts) in the past.

Additionally, or in the alternative, the set of tasks and/or the order of tasks listed in a particular checklist display 118 can be determined (e.g., by the processor(s) 122) at least partially based on the state data 152. For example, some fault isolation tasks 132 of the FIM 130 include checks to determine or verify the configuration 106, 110 of a particular system 104 or control 108. In this example, if the state data 152 indicates the configuration 106, 110 of the particular system 104 or control 108, a checklist item to determine the configuration 106, 110 can be omitted from the checklist display 118. Alternatively, the checklist item can be included in the checklist display 118 with a checklist item status 154 indicating that the checklist item is complete.

In some circumstances, the FIM 130 includes or refers to a deferrable maintenance task 136. A deferrable maintenance task 136 is a maintenance task associated with inoperative equipment, where dispatch is allowed with the equipment remaining inoperative in accordance with conditions detailed in the Minimum Equipment List (MEL). Accordingly, a maintenance task to repair or replace a system 104 that is not identified on the MEL 158 is not deferrable.

After a user performs a task, the user or the aircraft 102 can provide input indicating that the task is complete or indicating an outcome of the task. For example, the user can perform the task by modifying the configuration 110 of a control 108. In this example, the user can subsequently provide input to the aircraft maintenance system 120 to indicate that the task was performed. Alternatively, or additionally, modifying the configuration 110 of the control 108 can cause the state data 152 to be automatically updated based on a signal or data proved to the aircraft maintenance system 120 via the aircraft data bus(es) 160, in which case the signal or data can be used as the input to indicate that the task was performed.

In response to the input indicating that a task associated with a particular checklist item was performed, the checklist item status 154 is updated, and the checklist display 118 is modified to show the checklist item as complete, to show a result of the checklist item, to indicate a next checklist item to be performed, or a combination thereof. For example, some checklists include branching paths (each including a set of tasks) and which path is performed or the order of performance of the tasks in a path depends on the result of a particular task. To illustrate, the particular task can include a function check, and a different sequence of tasks can be performed depending on whether the function check is passed or failed.

In some situations, a particular maintenance task 136 is present in the list of tasks multiple times. For example, several components of a system may be located within a particular access panel of the aircraft 102. In this example, removal of the particular access panel can be listed as a maintenance task 136 in a replacement process for each of the components. In such situations, when the maintenance task 136 for removal of the access panel is indicated as complete, the checklist item status 154 associated with the maintenance task 136 is updated and each checklist item (not just a current or active checklist item) indicating the maintenance task 136 is updated to show the task as complete.

The update instructions 146 are executable by the processor(s) 122 to update the historical maintenance data 156 during or after maintenance. For example, after a particular task or set of tasks is indicated as complete, the update instructions 146 update the historical maintenance data 156 to indicate that the task(s) were performed and/or results of performing the task(s) (e.g., whether performing the task(s) cleared the fault condition or resulted in another detectable change, such as another fault condition or a change in a function check). In some implementations, the update instructions 146 also generate statistics or other analytic data based on the historical maintenance data 156. For example, the update instructions 146 calculate a probability that a particular task or set of tasks will resolve a particular fault condition in a particular context (e.g., when particular fault context data are present). In this example, probability data calculated by the update instructions 146 is stored with the historical maintenance data 156 and is used to determine an order of tasks to be performed when a similar fault condition is detected on the aircraft 102 or on another aircraft.

During operation, the aircraft maintenance system 120 receives an indication of a fault condition, such as the fault code data 148, the fault context data 150, or both. Responsive to initiating a maintenance activity related to the fault condition, the aircraft maintenance system 120 generates a first checklist display including a first set of incomplete checklist items. The first checklist display is generated based on, at least, the fault code data 148, the fault context data 150, and the state data 152. The first set of incomplete checklist items corresponds to or includes an ordered sequence of fault isolation tasks 132 derived from the FIM 130 associated with the aircraft 102, an ordered sequence of maintenance tasks 136 derived from a maintenance manual 134 associated with the aircraft 102, or an ordered sequence comprising both the fault isolation tasks 132 and the maintenance tasks 136. Each checklist item of the first set of incomplete checklist items is associated with a respective task. In some implementations, the first set of incomplete checklist items are ordered in the first checklist display based on estimates of a likelihood that performance of each of the corresponding tasks will resolve the fault condition(s). In some implementations, the first checklist display includes a numeric value or other estimate of a likelihood that performance of a particular task will resolve the one or more fault conditions.

After the first checklist display is generated and presented to a user, the aircraft maintenance system 120 receives input indicating completion of one or more checklist items of the first set of incomplete checklist items. The input can be provided by a user, such as via one of the controls 108 or via interaction with the first checklist display on the display device(s) 116. Additionally, or in the alternative, the input can be received via signals or data sent over the aircraft data bus(es) 160, such as a signal sent from a control 108 to a system 104 to change the configuration 106 of the system 104. The aircraft maintenance system 120 updates data in the memory device(s) 124 based on the input. In a particular example, the state data 152, the historical maintenance data 156, the checklist item status 154, or a combination thereof, are updated based on the input.

After receiving the input, the aircraft maintenance system 120 can generate a second checklist display including a second set of incomplete checklist items that is different from the first set of incomplete checklist items. For example, the checklist display 118 can be updated to identify a new task. The second checklist display is generated based on the fault code data 148, the fault context data 150, the updated state data 152, and the historical maintenance data 156.

In some situations, the tasks to be performed are dynamically selected (e.g., by the processor(s) 122) to generate a checklist display, and the list of tasks is static after this initial selection. In such situation, a set of incomplete checklist items (e.g., the second set of incomplete checklist items) presented in a subsequent checklist display (e.g., the second checklist display) includes each checklist item of the prior set of incomplete checklist items except the one or more checklist items indicated as complete. In other situations, the list of tasks to be performed is dynamically updated occasionally (e.g., by the processor(s) 122) while the checklist is being performed, such as when additional information becomes available or after results of particular tasks or checks are known. In such situations, the subsequent set of incomplete checklist items includes one or more checklist items that were not present in the prior set of incomplete checklist items. When a subsequent checklist display is generated, one or more checklist items of the prior set of incomplete checklist items can be automatically indicated as complete based on the input received from the systems 104, the controls 108, the sensors 112, or the health monitoring system 114.

In a particular implementation, after updating the historical maintenance data 156 based on maintenance that cleared the fault condition on the aircraft 102 or on another aircraft, the aircraft maintenance system 120 may obtain additional fault code data (e.g., second fault code data or subsequent fault code data) corresponding to a new fault condition and additional fault context data (e.g., second fault context data or subsequent fault code data) associated with the new fault condition. In response to determining that the additional fault code data matches (e.g., is identical to or similar to based on a comparison criterion) the prior fault code data and the additional fault context data matches (e.g., is identical to or similar to based on a comparison criterion) the prior fault context data, the aircraft maintenance system 120 generates a new checklist display (e.g., a third checklist display) including a set of incomplete checklist items (e.g., a third set of incomplete checklist items). The set of incomplete checklist items presented in the new checklist display is different from the set of incomplete checklist items presented in prior checklist displays (e.g., the first and second sets). For example, the aircraft maintenance system 120 selects the tasks to be performed, the order that the tasks are to be performed, or both, based on the updated historical maintenance data 156 to cause a task or tasks that resolved the prior fault condition to be performed earlier in the fault isolation process with the expectation that the task(s) that resolved the prior fault condition are likely to also resolve the current fault condition.

Thus, the aircraft maintenance system 120 provides an improved technical solution to the technical problem of aircraft fault isolation. For example, by updating the historical maintenance data 156 with information indicating which tasks resolved each complaint and using the updated historical maintenance data 156 to sequence tasks performed during subsequent maintenance activities, the aircraft maintenance system 120 generates checklists displays that are sorted in a manner that reduces the time needed to isolate and resolve a fault condition onboard the aircraft 102.

Figure 2C:
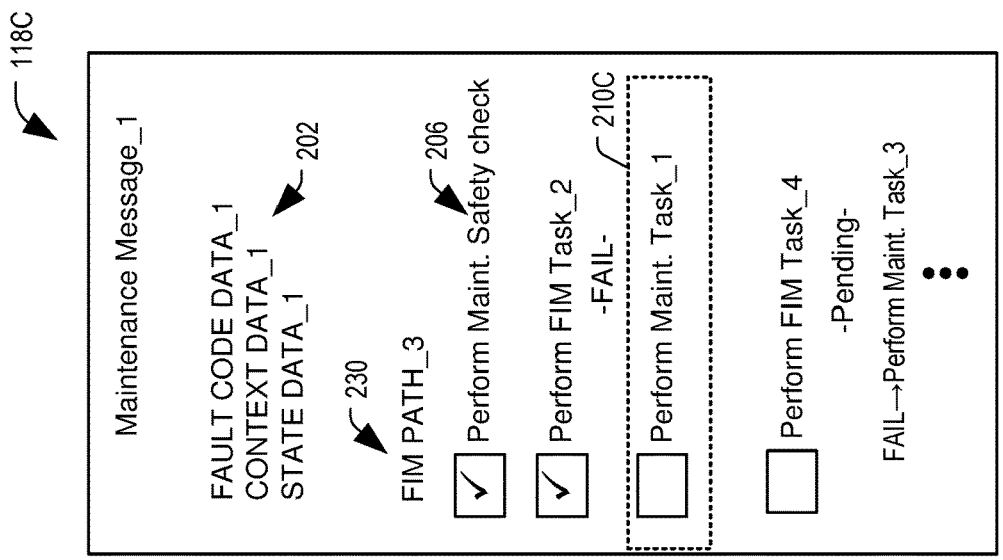
FIG. 2C is a diagram illustrating a third example of a checklist display according to a particular implementation of the system of FIG. 1.
Figure 2B:
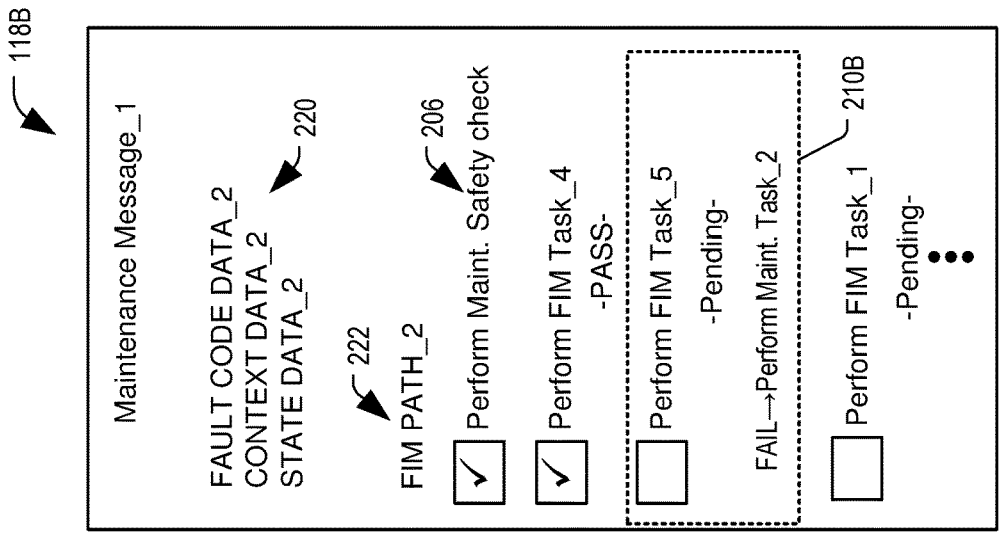
FIG. 2B is a diagram illustrating a second example of a checklist display according to a particular implementation of the system of FIG. 1.
Figure 2A:
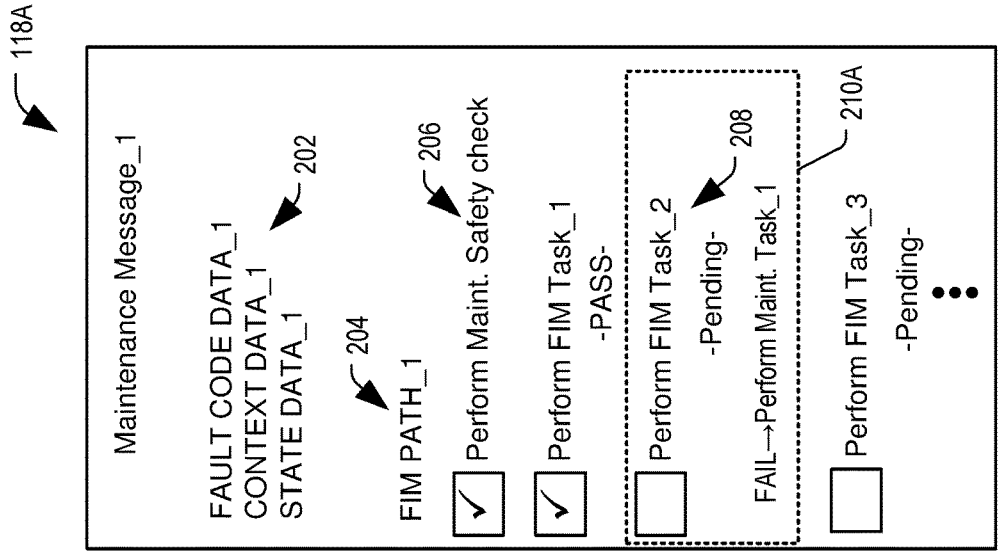
FIG. 2A is a diagram illustrating a first example of a checklist display according to a particular implementation of the system of FIG. 1.

FIGS. 2A-2C illustrate examples of checklist displays 118 including a first checklist display 118A in FIG. 2A, a second checklist display 118B in FIG. 2B, and a third checklist display 118C in FIG. 2C. The example checklist displays 118 in FIG. 2A-2C are merely intended to illustrate particular aspects of the disclosure. In some implementations, one or more features of the checklist displays 118 illustrated in FIGS. 2A-2C are omitted. In other implementations, the checklist displays 118 include additional features that are not shown in FIGS. 2A-2C.

In FIGS. 2A-2C, each checklist display 118 includes information 202, 220 descriptive of a fault condition. In FIGS. 2A-2C, the information 202, 220 includes a maintenance message (e.g., Maintenance Message_1), which provides a text description related to a fault condition. The information 202, 220 also includes fault code data 148 (e.g., FAULT CODE DATA_1 or FAULT CODE DATA_2), fault context data 150 (e.g., CONTEXT DATA_1 or CONTEXT DATA_2), and state data 152 (e.g., STATE DATA_1 and STATE DATA_2). In some implementations, the information 202, 220 also includes a descriptor of the system 104 associated with or affected by the fault condition. In FIGS. 2A-2C, each checklist display 118 also includes a plurality of checklist items associated with a fault isolation path 204, 222, 230 or a fault isolation process. Each fault isolation path 204, 222, 230 lists, as checklists items, an ordered sequence of tasks to be performed. As explained above, the sequence of the tasks in the checklist display 118 is based on at least the fault code data 148, the fault context data 150, and the historical maintenance data 156.

In FIG. 2A, the first checklist display 118A includes one or more completed checklist items 206, which are associated with check marks in the first checklist display 118A. Each completed checklist item 206 is associated with a checklist item status 154 indicating that the checklist item is complete. Additionally, some of the completed checklist items 206 are associated with state data 152 indicating that an aircraft state or configuration that is a result of performing a task associated with the completed checklist item 206. For example, in FIG. 2A, a completed checklist item 206 indicates that a FIM TASK_1 was performed. In this example, FIM TASK_1 is a function check, which was passed, and the state data 152 may therefore include a field or data element indicated that the function check associated with FIM TASK_1 was passed. As another example, in FIG. 2A, a completed checklist item 206 indicates that a maintenance safety check was performed. In some implementations, the maintenance safety check can include configuring particular systems 104 or controls 108 is a safe state (e.g., turning off electrical systems). In such implementations, performing the maintenance safety check can result in a particular configuration 106 of a system 104 or a particular configuration 110 of a control 108, and the configuration 106, 110 can be detected via signals or data communicated via the aircraft data bus(es) 160. In such implementations, the signals or data are used to update the state data 152 such that in a subsequent checklist display, such as the second checklist display 118B, the maintenance safety check can automatically be indicated as complete without user input.

In FIG. 2A, the first checklist display 118A also includes one or more incomplete checklist items 208, which are not associated with check marks in the first checklist display 118A. In FIGS. 2A-2C, a particular one of the incomplete checklist items is highlighted 210 or otherwise displayed in a visually distinct manner to indicate that the particular incomplete checklist item describes the next task to be performed in the sequence of tasks.

Differences between the checklist display 118A of FIG. 2A and the checklist display 118C of FIG. 2C illustrate progression through a single FIM process over time. For example, in FIG. 2A, the next task to be performed is FIM Task_2. In FIG. 2A, the checklist display 118A indicates that FIM PATH_1 branches depending on the result of FIM Task_2. For example, the checklist display 118A indicates that Maintenance Task_1 is to be performed if FIM Task_2 fails. However, if FIM Task_2 passes, the next task to be performed is FIM Task_3. In FIG. 2C, the FIM Task_2 is indicated as complete and failed, and the next task to be performed is Maintenance Task_1.

Differences between the checklist display 118A of FIG. 2A and the checklist display 118B of FIG. 2B illustrate changes in the order of tasks that performed responsive to a fault condition over time (e.g., based on accumulation of historical maintenance data 156 and dynamical ordering tasks in the checklist display 118). In some implementations, the FAULT CODE DATA_2 of FIG. 2B is the same as (i.e., is identical to) the FAULT CODE DATA_1 of FIG. 2A. In other implementations, the FAULT CODE DATA_2 of FIG. 2B is similar to (based on a comparison criterion) but not identical to the FAULT CODE DATA_1 of FIG. 2A. For example, the FAULT CODE DATA_1 and the FAULT CODE DATA_2 can both indicate faults in the same system 104 of the aircraft 102. Likewise, in some implementations, the CONTEXT DATA_2 of FIG. 2B is the same as (i.e., is identical to) the CONTEXT DATA_1 of FIG. 2A, and in other implementations, the CONTEXT DATA_2 of FIG. 2B is similar to (based on a comparison criterion) but not identical to the CONTEXT DATA_1 of FIG. 2A. For example, the CONTEXT DATA_1 and the CONTEXT DATA_2 may both includes a sensor reading that falls within a particular range indicated by the comparison criterion. Further, in some implementations, the STATE DATA_2 of FIG. 2B is the same as (i.e., is identical to) the STATE-DATA_1 of FIG. 2A, and in other implementations, the STATE DATA_2 of FIG. 2B is similar to (based on a comparison criterion) but not identical to the STATE DATA_1 of FIG. 2A. For example, a first subset of the systems 104 may have the same configuration 106 in the STATE DATA_1 and the STATE DATA_2 and the comparison criterion may indicate that sharing this configuration 106 indicates similarity for purposed of determine the checklist display 118. Thus, although there may be differences in the fault code data 148, the fault context data 150, the state data 152, or any combination thereof, between generation of the first checklist display 118A and the second checklist display 118B, the two checklist displays 118A, 118B relate to fault conditions that the aircraft maintenance system 120 considers match one another.

Following the sequence of tasks indicted by FIG. 2A and FIG. 2C, FIM Task_4 is to be performed after FIM Task_1, after FIM Task_2, and only if FIM Task_2 fails. However, in the sequence of tasks indicted by FIG. 2B, FIM Task_4 is to be performed before FIM Task_1, and FIM Task_1 is only performed if FIM Task_5 passes. This rearrangement of the sequence of tasks to be performed is based, at least in part, on the historical maintenance data 156. For example, during a first maintenance operation (or a first set of maintenance operations) it may be the case that the fault condition associated with FAULT CODE DATA_1, CONTEXT DATA_1, and STATE DATA_1 is frequently resolved by performing FIM Task_4 and is rarely resolved by performing FIM Task_1. In this situation, the dynamic fault isolation instructions 144 dynamically reorder the sequence of tasks to schedule performance of FIM Task_4 before performance of FIM Task_1. One technical benefit of the dynamic fault isolation process rearranging the sequence of tasks in this manner is increased availability of the aircraft 102 because the dynamic reordering results in earlier performance of tasks that are likely to resolve the fault condition.

Figure 3:
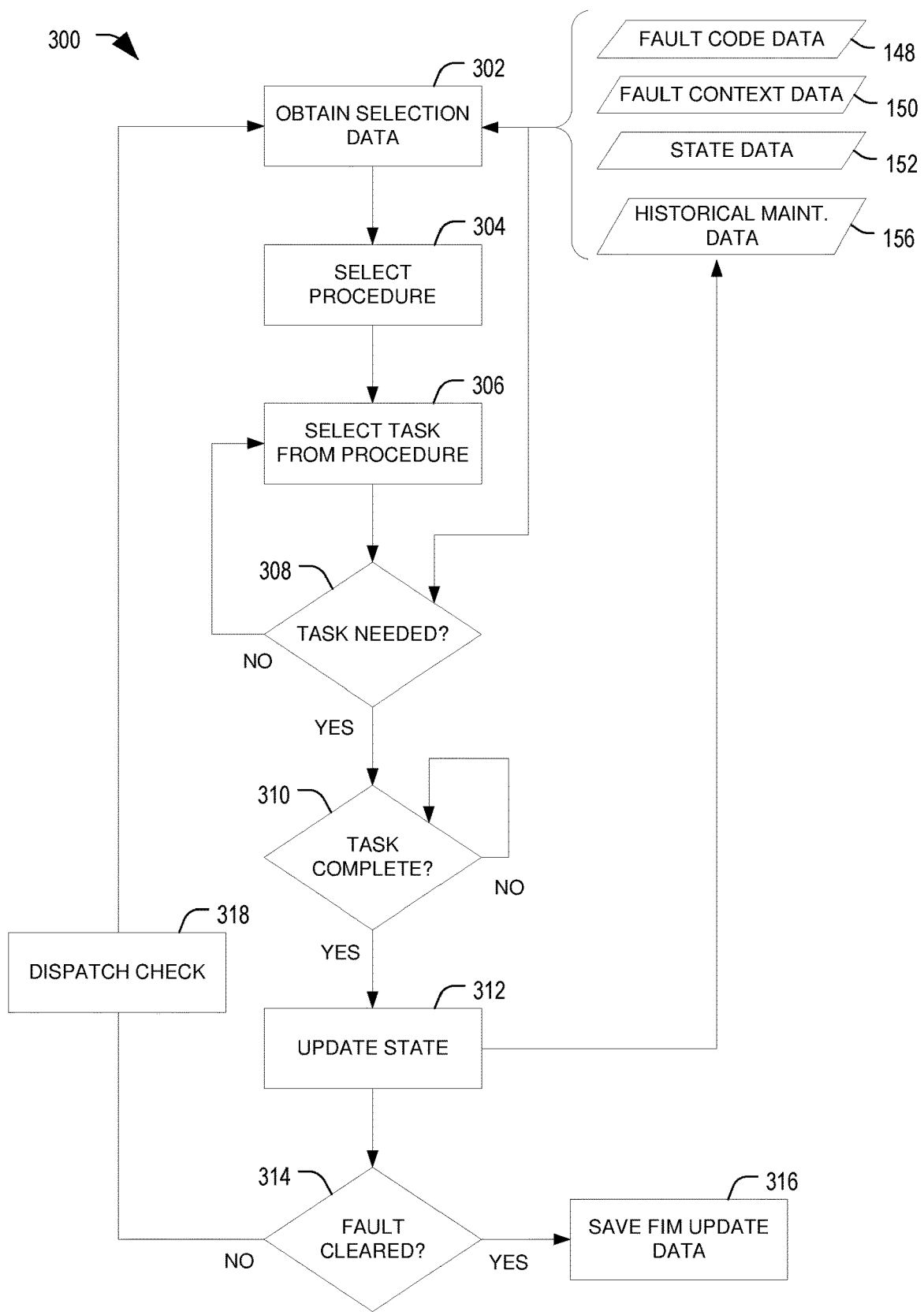
FIG. 3 is a flowchart of an example of a method of dynamic fault isolation according to a particular implementation.

FIG. 3 is a flowchart of an example of a method 300 of dynamic fault isolation according to a particular implementation. The method 300 can be performed by the aircraft maintenance system 120 of FIG. 1 in response to receiving an indication that a fault condition has been detected. For example, the processor(s) 122 can execute the dynamic fault isolation instructions 144, the update instructions 146, or both, to perform various operations of the method 300.

The method 300 includes, at 302, obtaining selection data. Examples of selection data include the fault code data 148, the fault context data 150, the state data 152, and the historical maintenance data 156. The selection data can be obtained from the memory device(s) 124, from the health monitoring system 114, from the sensors 112, from the data repository 138, or combinations thereof.

The method 300 also includes, at 304, selecting a procedure to be performed based on the selection data. The procedure includes a set of tasks to isolate or resolve a fault condition. Generally, the procedure is selected based on the fault code data as specified by the FIM 130, and one procedure can refer to or incorporate other procedures. For example, a specific FIM procedure may include a fault isolation task that requires performance of a particular maintenance procedure that includes multiple maintenance tasks. Thus, procedures can be nested and can include branching paths.

In some implementations, selecting the procedure includes selecting an order of performance of a set of tasks. In such implementations, the order of performance or sequence of the tasks is selected such that tasks that are more likely to result in resolving the fault condition are scheduled to be performed before tasks that are less likely to resolve the fault condition. For example, the historical maintenance data 156 can be evaluated to determine which task or tasks have resolved similar fault conditions. In this context, a fault condition that occurred in a prior instance is considered similar to the present fault condition if the two fault conditions have the same or related fault codes, affect the same or related systems 104, and occurred in similar contexts (e.g., the fault context data 150 matches fault context data associated with the prior instance within some specified similarity threshold or criterion).

The method 300 further includes, at 306, selecting a task from the procedure and determining whether the task needs to be performed, at 308. For example, the selected task (or each task) of the procedure can be evaluated based on the state data 152 to determine whether the task is needed. In some situations, one or more of the tasks may not need to be performed because the state data 152 indicates that an aircraft state to be achieved by performing the task is already present. To illustrate, if the task relates to adjusting the configuration 110 of a particular control (e.g., turning a knob to a specified setting), the method 300 determines, at 308, whether that task is needed by determining whether the particular control 108 already has the target configuration 110 (e.g., is already turned to the specified setting).

If the task is not needed, at 308, the method 300 selects another task, at 306. If the task is needed, the method 300 determined whether the task is complete. For example, the task can be listed in a checklist display 118, and the method 300 can determine that the task is complete when input is received indicating that the task is complete. In some circumstances, the input is user input indicating completion of the task. In other instances, the input is a signal or data from a system 104 of the aircraft 102 that indicates the configuration 106 of the system 104 or a change of the configuration 106 of the system 104. For example, if the task is to deploy flaps of the aircraft 102, the input can be a signal indicating that the flaps are deployed or a signal commanding deployment of the flaps. In still other instances, the input is a signal or data from a control 108 of the aircraft 102 that indicates the configuration 110 of the control 108 or a change of the configuration 110 of the control 108. For example, if the task is to toggle a switch, the input can be a signal that is generated responsive to toggling the switch. In yet other instances, the input is a signal or data from a sensor 112 of the aircraft 102 that indicates a condition or change associated with performing the task. For example, if the task is to deploy flaps of the aircraft 102, the input can be a signal from a flap position sensor indicating that the flaps are deployed.

When the task is complete, the method 300 includes, at 312, updating the state. For example, the processor(s) 122 store new or update state data 152 responsive to determining that the task is complete. Additionally, or in the alternative, the processor(s) 122 update the checklist item status 154 of a checklist item associated with the task.

The method 300 also includes, at 314, determining whether the fault is cleared (e.g., determining whether the fault condition is still present). For example, the processor(s) 122 may perform an automated function check to determine whether the fault is cleared. Alternatively, a user can initiate a function check to determine whether the fault is cleared. Although FIG. 3 illustrates determining whether the fault is cleared after each single task is performed, in other implementations, the method 300 can be arranged such that multiple tasks are performed between checks to determine whether the fault is cleared. For example, a function check to determine whether the fault is cleared can be performed automatically according to a schedule (e.g., periodically), in which case the determination of whether the fault is clear may sometimes come after a single task is performed and may at other times come after several tasks have been performed.

The method 300 includes, if the fault is cleared, saving FIM update data, at 316. In some implementations, the FIM update data updates or modifies the FIM 130. For example, the FIM update data may cause an order of tasks listed in the FIM 130 be changed. In other implementations, the FIM update data updates or modifies the historical maintenance data 156 to indicate which task or tasks were performed to clear the fault. In such implementations, the updated or modified historical maintenance data 156 is used to dynamically change the order of tasks in the FIM 130 when the method 300 is performed at some future time, such as when another aircraft experiences a similar fault condition.

In some implementations, the method 300 also includes, if the fault is not cleared, performing a dispatch check, at 318. The dispatch check determines whether the fault prevents dispatch of the aircraft 102. For example, if fault isolation tasks that have already been performed or the fault code data 148 narrows the fault down to a particular system 104 and the particular system 104 is listed in the MEL 158, the dispatch check 318 indicates that aircraft 102 can be returned to service and maintenance to clear the fault can be deferred until a more convenient time. If the particular system 104 is not listed in the MEL 158 or a user determines not to defer maintenance, the method 300 continues by performing another iteration. In the example illustrated in FIG. 3, the next iteration begins by obtaining selection data, at 302; however, in other implementations, the next iteration begins by selecting a procedure, at 304, based on previously obtained selection data or begins by selecting another task from the previously selected procedure, at 306.

The various operations illustrated in FIG. 3 are performed in a different order in other implementations. For example, in some implementations, the dispatch check is performed before the procedure is selected, before the task is selected, or before the task is determined to be complete.

Figure 4:
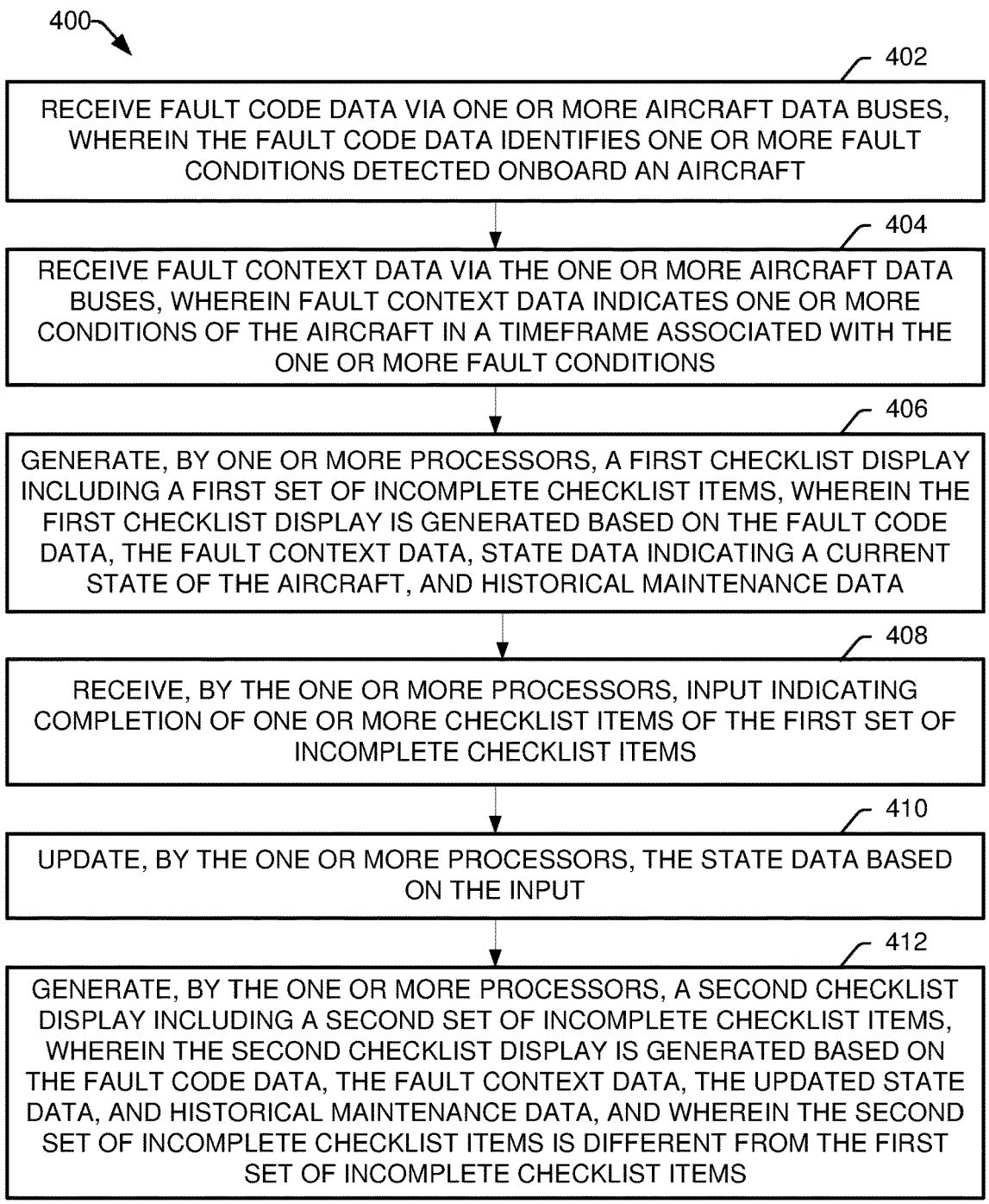
FIG. 4 is a flowchart of another example of a method of dynamic fault isolation according to a particular implementation.

FIG. 4 is a flowchart of another example of a method 400 of dynamic fault isolation according to a particular implementation. The method 400 can be performed by the aircraft maintenance system 120 of FIG. 1. For example, the processor(s) 122 can execute the dynamic fault isolation instructions 144, the update instructions 146, or both, to perform various operations of the method 400.

The method 400 includes, at 402, receiving fault code data via one or more aircraft data buses, where the fault code data identifies one or more fault conditions detected onboard an aircraft. For example, the aircraft maintenance system 120 receives the fault code data 148 from the health monitoring system 114.

The method 400 also includes, at 404, receiving fault context data via the one or more aircraft data buses, where fault context data indicates one or more conditions of the aircraft in a timeframe associated with the one or more fault conditions. For example, the aircraft maintenance system 120 receives the fault context data 150 from the systems 104, the controls 108, the sensors 112, the health monitoring system 114, or a combination thereof.

The method 400 further includes, at 406, generating, by one or more processors, a first checklist display including a first set of incomplete checklist items, where the first checklist display is generated based on the fault code data, the fault context data, state data indicating a current state of the aircraft, and historical maintenance data. For example, the aircraft maintenance system 120 selects a FIM procedure to be performed based on the fault code data 148 and determines an order in which the tasks of the FIM procedure should be performed to most expediently resolve the fault condition. In this example, the tasks are order in a sequence from most likely to resolve the fault condition (based on historical maintenance data and how closely the fault context data matches prior fault context data) to least likely to resolve the fault condition. In some implementations, other factors can also be considered to determine the order of the tasks, such as time or parts available associated with each task. To illustrate, a task that can be performed very quickly but is less likely to resolve the fault may be scheduled ahead of a task that is more likely to resolve the fault but that requires much more time to perform. As another illustrative example, a task that is less likely to resolve the fault but does not require any parts or supplies may be scheduled ahead of a task that is more likely to resolve the fault but that requires expensive parts or supplies or difficult to obtain (e.g., long lead time) parts or supplies.

After the order of the tasks is determined, the first checklist display is generated and arranges the tasks in a sequence based on the determined order. The first checklist display is presented to a user via the display device(s) 116 to guide the user through performance of the various tasks. Initially, the first checklist display includes a list of incomplete checklist items, with each incomplete checklist item corresponding to a task that has not been performed. In some situations, the first checklist display can also initially list one or more complete checklist items. For example, if a particular checklist item instructs the user to change the configuration 110 of a control 108 to a target configuration and the aircraft maintenance system 120 is able to automatically determine (e.g., via signals on the aircraft data bus(es) 160) that the control 108 is in the target configuration, the first checklist display may display the particular checklist item with an indication that the particular checklist item is completed.

The method 400 includes, at 408, receiving, by the one or more processors, input indicating completion of one or more checklist items of the first set of incomplete checklist items. For example, the aircraft maintenance system 120 can receive user input or signals or data from the aircraft data bus(es) to indicate that a checklist item is complete.

The method 400 includes, at 410, updating, by the one or more processors, the state data based on the input. For example, the aircraft maintenance system 120 updates the state data 152 based on the input. Additionally, or in the alternative, the one or more processors update the checklist item status 154, the historical maintenance data 156, or both, based on the input.

The method 400 includes, at 412, generating, by the one or more processors, a second checklist display including a second set of incomplete checklist items. For example, the aircraft maintenance system 120 generates a subsequent checklist display, such as one of the checklist displays 118B or 118C. In this example, the subsequent checklist display may be generated based on the fault code data, the fault context data, the updated state data, and historical maintenance data, and the second set of incomplete checklist items may be different from the first set of incomplete checklist items.

Figure 5:
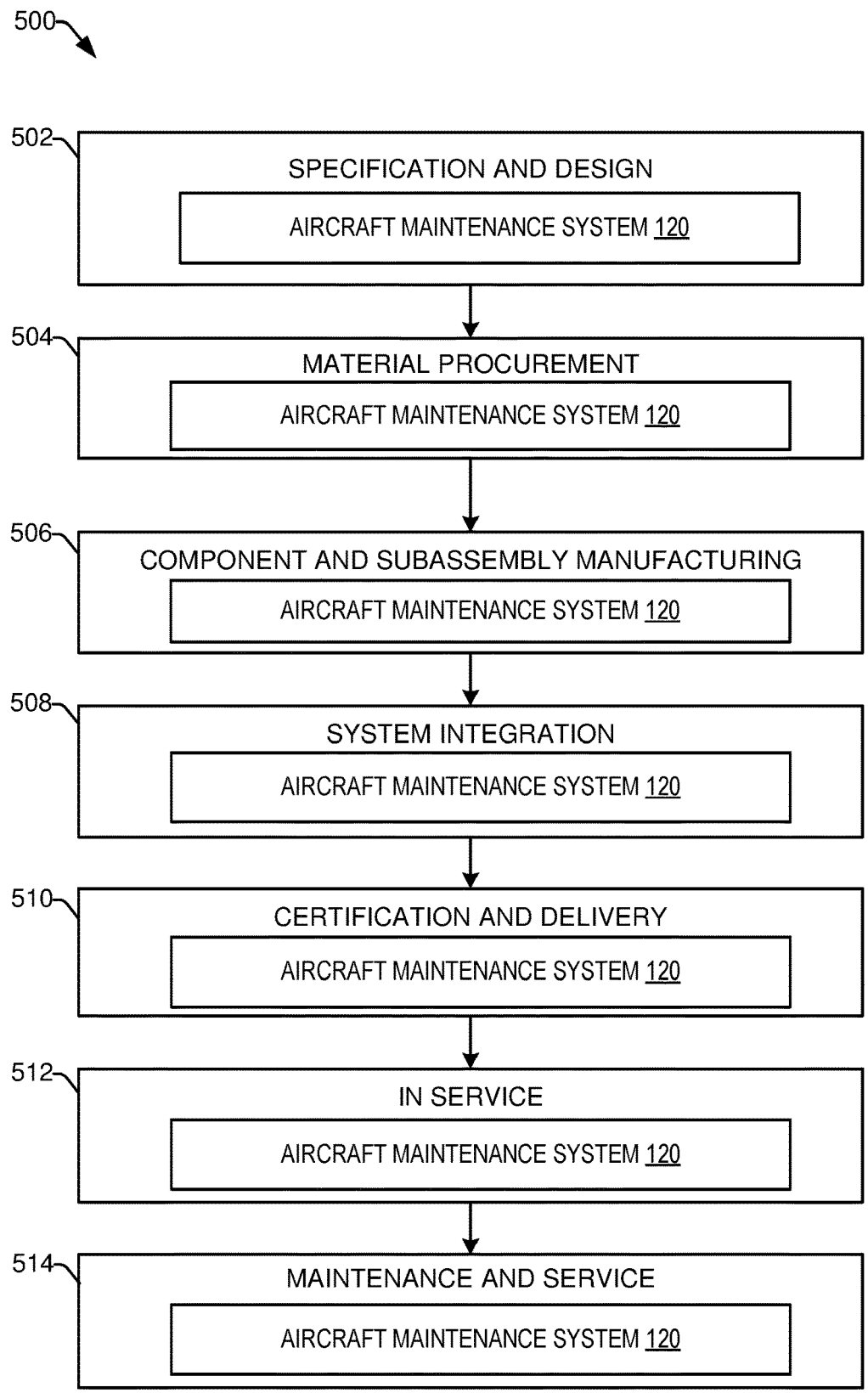
FIG. 5 illustrates a life cycle of the aircraft of FIG. 1 according to a particular implementation.

FIG. 5 is a flowchart illustrating a life cycle of an aircraft that includes the aircraft maintenance system 120 of FIG. 5. During pre-production, the exemplary life cycle 500 includes, at block 502, specification and design of an aircraft, such as the aircraft 102 described with reference to FIG. 1. During specification and design of the aircraft, the life cycle 500 may include specification and design of the aircraft maintenance system 120. At block 504, the life cycle 500 includes material procurement, which may include procuring materials for the aircraft maintenance system 120.

During production, the life cycle 500 includes, at block 506, component and subassembly manufacturing and, at block 508, system integration of the aircraft. For example, the life cycle 500 may include component and subassembly manufacturing of the aircraft maintenance system 120 and system integration of the aircraft maintenance system 120. At block 510, the life cycle 500 includes certification and delivery of the aircraft and, at block 512, placing the aircraft in service. Certification and delivery may include certification of the aircraft maintenance system 120 to place the aircraft maintenance system 120 in service. While in service by a customer, the aircraft may be scheduled for routine maintenance and service (which may also include modification, reconfiguration, refurbishment, and so on). At block 514, the life cycle 500 includes performing maintenance and service on the aircraft, which may include performing maintenance and service on the aircraft maintenance system 120.

Each of the processes of the life cycle 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
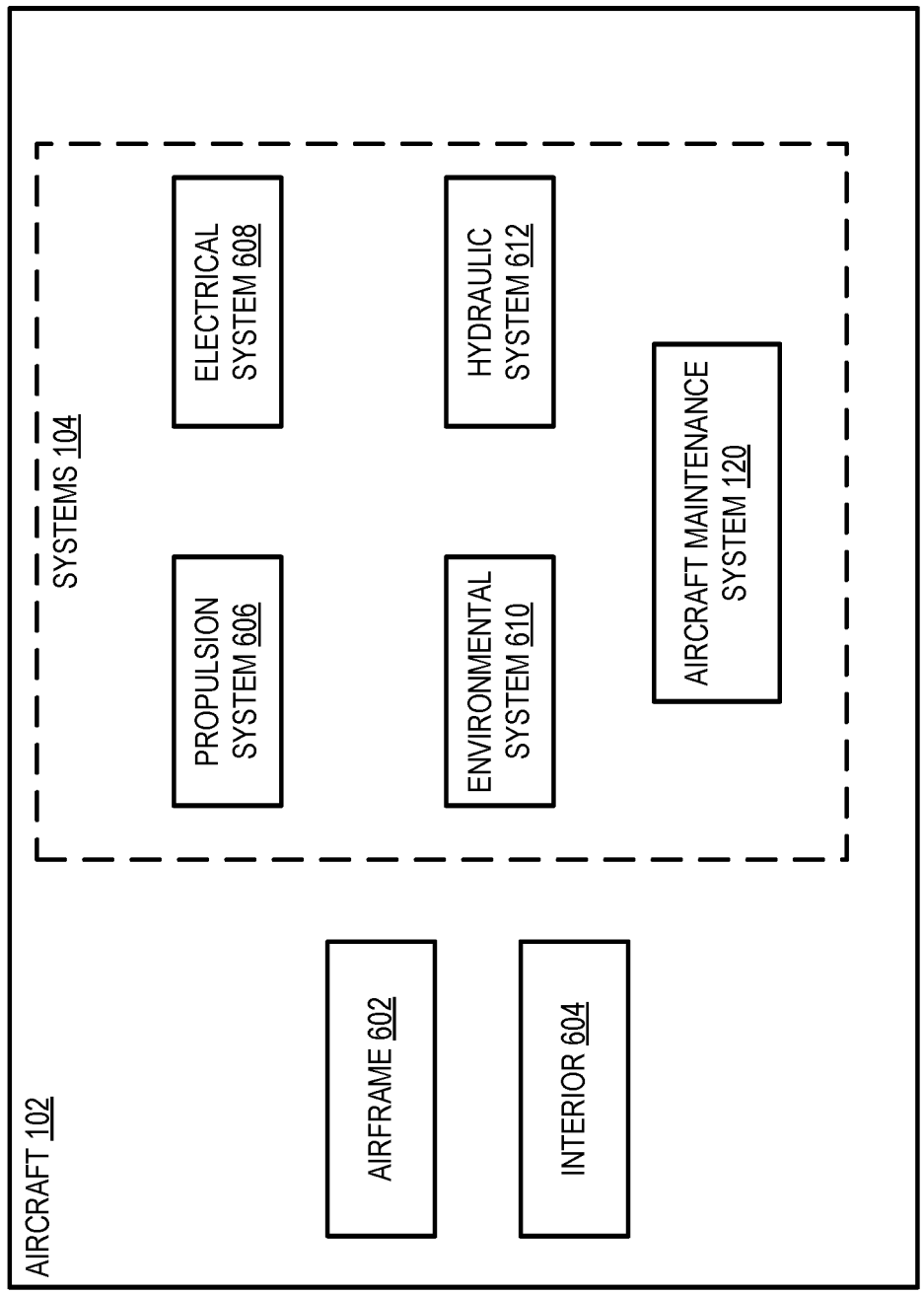
FIG. 6 is a block diagram that illustrates the aircraft of FIG. 1 according to a particular implementation.

Aspects of the disclosure can be described in the context of an example of a vehicle. A particular example of a vehicle is an aircraft 102 as shown in FIG. 1. In the example of FIG. 6, the aircraft 102 includes an airframe 602 with an interior 604 and the systems 104. In the example illustrated in FIG. 6, the systems 104 include a propulsion system 606, an electrical system 608, an environmental system 610, a hydraulic system 612, and the aircraft maintenance system 120. Any number of other systems may be included.

Figure 7:
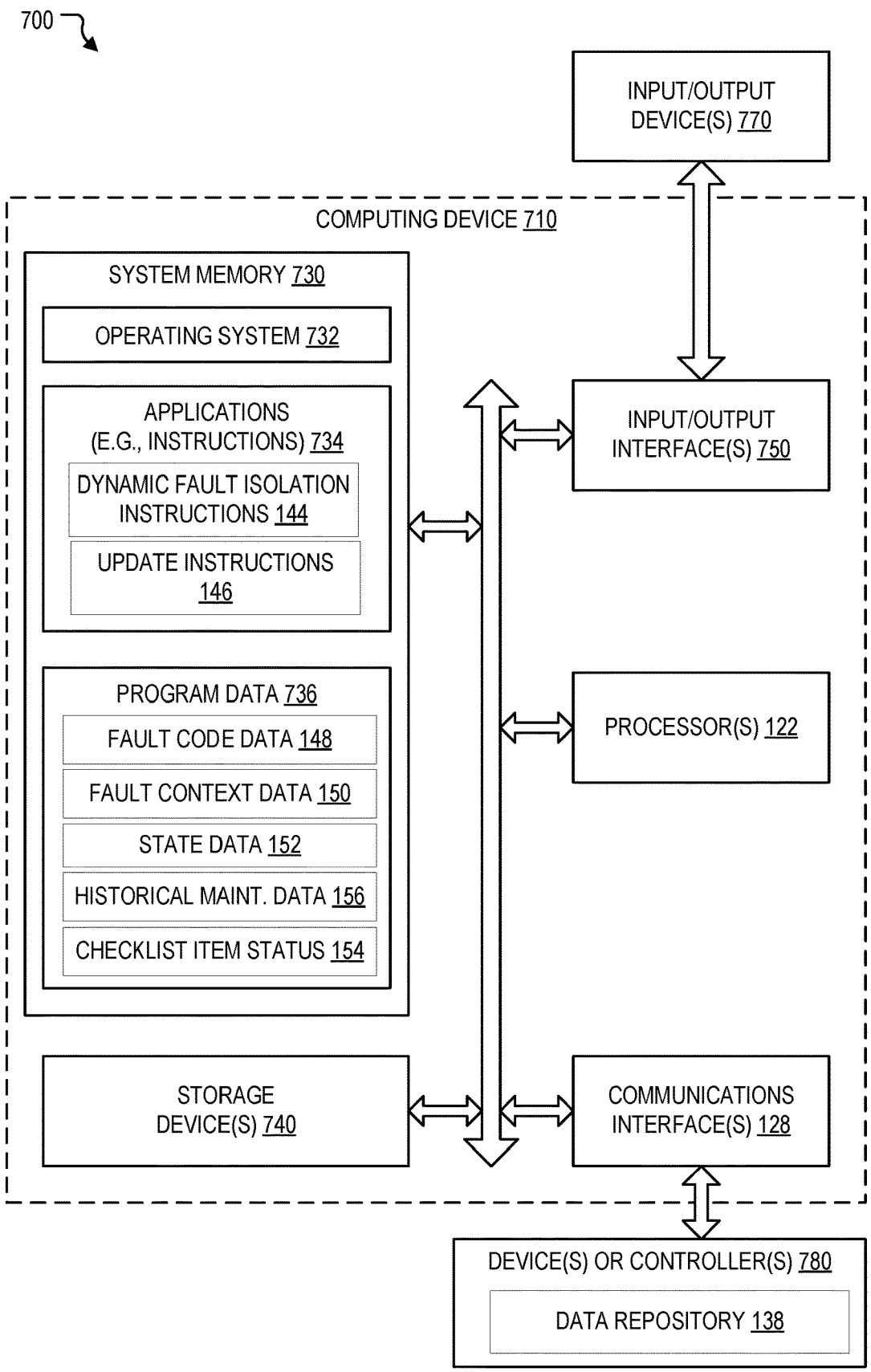
FIG. 7 illustrates a computing environment including the aircraft maintenance system of FIG. 1 according to a particular implementation.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-4. The example of FIG. 7 illustrates an implementation in which the aircraft maintenance system 120 is not integrated onboard the aircraft 102. For example, the aircraft maintenance system 120 can be embodied in a computing device (e.g., a notebook computer or tablet computer) that is coupled to the aircraft 102 temporarily, such as to perform maintenance or fault isolation tasks.

The computing device 710 includes the one or more processor(s) 122. The processor(s) 122 are configured to communicate with system memory 730, one or more storage device(s) 740, one or more input/output interface(s) 750, the one or more communication interface(s) 128, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores program data 736, such as the fault code data 148, the fault context data 150, the state data 152, the historical maintenance data 156, the checklist item status 154, or a combination thereof.

The system memory 730 includes one or more applications 734 (e.g., sets of instructions) executable by the processor(s) 122. As an example, the one or more applications 734 include instructions executable by the processor(s) 122 to initiate, control, or perform one or more operations described with reference to FIGS. 1-4. To illustrate, the one or more applications processor(s) 122 include the dynamic fault isolation instructions 144 and the update instructions 146.

The one or more storage device(s) 740 include nonvolatile storage devices, such as magnetic disks, optical disks, or flash memory devices. In a particular example, the storage device(s) 740 include both removable and non-removable memory devices. The storage device(s) 740 are configured to store an operating system, images of operating systems, applications (e.g., one or more of the applications 734), and program data (e.g., the program data 736). In a particular aspect, the system memory 730, the storage device(s) 740, or both, include tangible computer-readable media. In a particular aspect, one or more of the storage device(s) 740 are external to the computing device 710.

The one or more input/output interface(s) 750 that enable the computing device 710 to communicate with one or more input/output device(s) 770 to facilitate user interaction. For example, the input/output interface(s) 750 can include a checklist display, a display interface, an input interface, or both. For example, the input/output interface(s) 750 is adapted to receive input from a user, to receive input from another computing device, or a combination thereof. In some implementations, the input/output interface(s) 750 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output interface(s) 704 includes one or more user interface devices and displays, including some combination of buttons, keyboards, pointing devices, displays, speakers, microphones, touch screens, and other devices.

The processor(s) 122 are configured to communicate with device(s) or controller(s) 780 via the one or more communication interface(s) 128. For example, the one or more communication interface(s) 128 can include a network interface. The device(s) or controller(s) 780 can include, for example, the data repository 138.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-4. In some implementations, part or all of one or more of the operations or methods of FIGS. 1-4 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Various aspects of the disclosure are described below in a set of interrelated clauses:

According to Clause 1, an aircraft maintenance system comprises one or more data bus interfaces to receive fault code data and fault context data via one or more aircraft data buses. The fault code data identifies one or more fault conditions detected onboard an aircraft, and the fault context data indicates one or more conditions of the aircraft in a timeframe associated with the one or more fault conditions. The aircraft maintenance system also comprises one or more processors coupled to the one or more data bus interfaces and one or more memory devices accessible to the one or more processors. The one or more memory devices store instructions that are executable by the one or more processors to cause the one or more processors to generate a first checklist display including a first set of incomplete checklist items. The first checklist display is generated based on the fault code data, the fault context data, state data indicating a current state of the aircraft, and historical maintenance data. The one or more memory devices store instructions that are executable by the one or more processors to receive input indicating completion of one or more checklist items of the first set of incomplete checklist items and update the state data based on the input. The one or more memory devices store instructions that are executable by the one or more processors to generate a second checklist display including a second set of incomplete checklist items. The second checklist display is generated based on the fault code data, the fault context data, the updated state data, and the historical maintenance data. The second set of incomplete checklist items is different from the first set of incomplete checklist items.

According to Clause 2, the aircraft maintenance system of Clause 1, further comprises a display device onboard the aircraft, where the display device is configured to display the first checklist display and the second checklist display.

According to Clause 3, in the aircraft maintenance system of either of Clauses 1 or 2, the one or more memory devices store at least a portion of the historical maintenance data.

According to Clause 4, the aircraft maintenance system of any of Clauses 1-3, further comprises a communication interface configured to access at least a portion of the historical maintenance data from a data repository offboard the aircraft.

According to Clause 5, in the aircraft maintenance system of any of Clauses 1-4, the fault code data is associated with multiple fault isolation paths, wherein each fault isolation path of the multiple fault isolation paths specifies a sequence of tasks to isolate a cause of a particular fault condition of the one or more fault conditions.

According to Clause 6, in the aircraft maintenance system of any of Clauses 1-5, the fault context data comprises sensor data indicating an operational environment associated with the aircraft during the timeframe, configuration data indicating a state of the aircraft during the timeframe, or both.

According to Clause 7, in the aircraft maintenance system of any of Clauses 1-6, the historical maintenance data identifies prior maintenance activity associated with the aircraft, associated with one or more other aircraft, or associated with both, and the prior maintenance activity indicates a plurality of historical fault conditions, historical fault context data associated with each of the historical fault conditions, a respective ordered sequence of tasks performed to resolve each of the historical fault conditions.

According to Clause 8, in the aircraft maintenance system of any of Clauses 1-7, the state data indicates one or more configuration states of the aircraft.

According to Clause 9, in the aircraft maintenance system of any of Clauses 1-8, the instructions are further executable by the one or more processors to cause the one or more processors to update the historical maintenance data based on the input.

According to Clause 10, in the aircraft maintenance system of any of Clauses 1-9, the instructions are further executable by the one or more processors to cause the one or more processors to, after updating the historical maintenance data, obtain second fault code data and second fault context data via the one or more data bus interfaces, and responsive to the second fault code data matching the fault code data and the second fault context data matching the fault context data, generate a third checklist display including a third set of incomplete checklist items, wherein the third set of incomplete checklist items is different from the first set of incomplete checklist items and is different from the second set of incomplete checklist items.

According to Clause 11, in the aircraft maintenance system of any of Clauses 1-10, the input includes one or more data bus signals detected by the one or more data bus interfaces, wherein the one or more data bus signals indicate a configuration state of the aircraft or a change of the configuration state of the aircraft.

According to 12, in the aircraft maintenance system of Clause 11, the one or more data bus signals are generated responsive to a user changing the configuration of the aircraft.

According to Clause 13, in the aircraft maintenance system of Clause 11, the input includes user input received responsive to the first checklist display.

According to Clause 14, in the aircraft maintenance system of any of Clauses 1-13, generating the second checklist display comprises automatically indicating as complete one or more checklist items of the first set of incomplete checklist items.

According to 15, in the aircraft maintenance system of Clause 14, the second set of incomplete checklist items includes each checklist item of the first set of incomplete checklist items except the one or more checklist items indicated as complete.

According to 16, in the aircraft maintenance system of Clause 14, the second set of incomplete checklist items includes one or more checklist items not present in the first set of incomplete checklist items.

According to Clause 17, in the aircraft maintenance system of any of Clauses 1-16, the timeframe associated with the one or more fault conditions corresponds to a period before or simultaneous with detection of the one or more fault conditions.

According to Clause 18, in the aircraft maintenance system of any of Clauses 1-17, the first set of incomplete checklist items corresponds to comprises an ordered sequence of fault isolation tasks derived from a fault isolation manual associated with the aircraft, an ordered sequence of maintenance tasks derived from a maintenance manual associated with the aircraft, or an ordered sequence comprising both fault isolation tasks and maintenance tasks.

According to Clause 19, in the aircraft maintenance system of Clause 18, a sequence of the first set of incomplete checklist items is determined based on the fault code data, the fault context data, the state data, and the historical maintenance data.

According to Clause 20, in the aircraft maintenance system of Clause 18, a checklist item of the first set of incomplete checklist items is associated with a task, and wherein the first checklist display further comprises an estimate of a likelihood that performance of the task will resolve the one or more fault conditions.

According to Clause 21, in the aircraft maintenance system of Clause 18, each of a plurality of checklist items of the first set of incomplete checklist items is associated with a corresponding task, and wherein the first set of incomplete checklist items are ordered in the first checklist display based on estimates of a likelihood that performance of each of the corresponding tasks will resolve the one or more fault conditions.

According to Clause 22, a method comprises receiving fault code data via one or more aircraft data buses, wherein the fault code data identifies one or more fault conditions detected onboard an aircraft. The method also comprises receiving fault context data via the one or more aircraft data buses, wherein fault context data indicates one or more conditions of the aircraft in a timeframe associated with the one or more fault conditions. The method further comprises generating, by one or more processors, a first checklist display including a first set of incomplete checklist items, wherein the first checklist display is generated based on the fault code data, the fault context data, state data indicating a current state of the aircraft, and historical maintenance data. The method also comprises receiving, by the one or more processors, input indicating completion of one or more checklist items of the first set of incomplete checklist items and updating, by the one or more processors, the state data based on the input. The method further comprises generating, by the one or more processors, a second checklist display including a second set of incomplete checklist items, wherein the second checklist display is generated based on the fault code data, the fault context data, the updated state data, and historical maintenance data, and wherein the second set of incomplete checklist items is different from the first set of incomplete checklist items.

According to Clause 23, the method of Clause 24, further comprises displaying the first checklist display and the second checklist display at a display device onboard the aircraft.

According to Clause 24, the one or more memory devices of either of clauses 23 or 24 store at least a portion of the historical maintenance data.

According to Clause 25, the method of any of Clauses 22-24, further comprises accessing at least a portion of the historical maintenance data from a data repository offboard the aircraft.

According to Clause 26, in the method of any of Clauses 22-25, the fault code data is associated with multiple fault isolation paths, wherein each fault isolation path of the multiple fault isolation paths specifies a sequence of tasks to isolate a cause of a particular fault condition of the one or more fault conditions.

According to Clause 27, in the method of any of Clauses 22-26, the fault context data comprises sensor data indicating an operational environment associated with the aircraft during the timeframe, configuration data indicating a state of the aircraft during the timeframe, or both.

According to Clause 28, in the method of any of Clauses 22-27, the historical maintenance data identifies prior maintenance activity associated with the aircraft, associated with one or more other aircraft, or associated with both, and the prior maintenance activity indicates a plurality of historical fault conditions, historical fault context data associated with each of the historical fault conditions, a respective ordered sequence of tasks performed to resolve each of the historical fault conditions.

According to Clause 29, in the method of any of Clauses 22-28, the state data indicates one or more configuration states of the aircraft.

According to Clause 30, in the method of any of Clauses 22-29, further comprising updating the historical maintenance data based on the input.

According to Clause 31, in the method of Clause 30, further comprises, after updating the historical maintenance data, obtaining second fault code data and second fault context data via the one or more data bus interfaces, and responsive to the second fault code data matching the fault code data and the second fault context data matching the fault context data, generating a third checklist display including a third set of incomplete checklist items, wherein the third set of incomplete checklist items is different from the first set of incomplete checklist items and is different from the second set of incomplete checklist items.

According to Clause 32, in the method of any of Clauses 22-31, the input includes one or more data bus signals detected by the one or more data bus interfaces, wherein the one or more data bus signals indicate a configuration state of the aircraft or a change of the configuration state of the aircraft.

According to Clause 33, in the method of Clause 32, the one or more data bus signals are generated responsive to a user changing the configuration of the aircraft.

According to Clause 34, in the method of Clause 32, the input includes user input received responsive to the first checklist display.

According to Clause 35, in the method of any of Clauses 22-34, generating the second checklist display comprises automatically indicating as complete one or more checklist items of the first set of incomplete checklist items.

According to Clause 36, in the method of Clause 35, the second set of incomplete checklist items includes each checklist item of the first set of incomplete checklist items except the one or more checklist items indicated as complete.

According to Clause 37, in the method of Clause 35, the second set of incomplete checklist items includes one or more checklist items not present in the first set of incomplete checklist items.

According to Clause 38, in the method of any of Clauses 22-37, the timeframe associated with the one or more fault conditions corresponds to a period before or simultaneous with detection of the one or more fault conditions.

According to Clause 38, in the method of any of Clauses 22-38, the first set of incomplete checklist items correspond to comprises an ordered sequence of fault isolation tasks derived from a fault isolation manual associated with the aircraft, an ordered sequence of maintenance tasks derived from a maintenance manual associated with the aircraft, or an ordered sequence comprising both fault isolation tasks and maintenance tasks.

According to Clause 39, in the method of Clause 38, a sequence of the first set of incomplete checklist items is determined based on the fault code data, the fault context data, the state data, and the historical maintenance data.

According to Clause 40, in the method of Clause 38, a checklist item of the first set of incomplete checklist items is associated with a task, and wherein the first checklist display further comprises an estimate of a likelihood that performance of the task will resolve the one or more fault conditions.

According to Clause 41, in the method of Clause 38, each of a plurality of checklist items of the first set of incomplete checklist items is associated with a corresponding task, and wherein the first set of incomplete checklist items are ordered in the first checklist display based on estimates of a likelihood that performance of each of the corresponding tasks will resolve the one or more fault conditions.

According to Clause 42, a computer-readable storage device stores instructions that are executable by one or more processors to cause the one or more processors to perform operations comprising receiving fault code data identifying one or more fault conditions detected onboard an aircraft. The operations also comprise receiving fault context data indicating one or more conditions of the aircraft in a timeframe associated with the one or more fault conditions. The operations further comprise generating a first checklist display including a first set of incomplete checklist items, wherein the first checklist display is generated based on the fault code data, the fault context data, state data indicating a current state of the aircraft, and historical maintenance data. The operations also comprise receiving input indicating completion of one or more checklist items of the first set of incomplete checklist items and updating the state data based on the input. The operations further comprise generating a second checklist display including a second set of incomplete checklist items, wherein the second checklist display is generated based on the fault code data, the fault context data, the updated state data, and historical maintenance data, and wherein the second set of incomplete checklist items is different from the first set of incomplete checklist items.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft maintenance system comprising:
one or more data bus interfaces to receive fault code data and fault context data via one or more aircraft data buses, wherein the fault code data identifies one or more fault conditions detected onboard an aircraft and the fault context data indicates one or more conditions of the aircraft in a timeframe associated with the one or more fault conditions;
one or more processors coupled to the one or more data bus interfaces; and
one or more memory devices accessible to the one or more processors, the one or more memory devices storing instructions that are executable by the one or more processors to cause the one or more processors to:
generate a first checklist display including a first set of incomplete checklist items, wherein the first checklist display is generated based on two or more of the fault code data, the fault context data, state data indicating a current state of the aircraft, and historical maintenance data;
receive input indicating completion of one or more checklist items of the first set of incomplete checklist items;
update the state data based on the input; and
in response to a first determination that the one or more fault conditions are not cleared:
responsive to isolation of a cause of the one or more fault conditions to one or more particular systems and responsive to a second determination that each of the one or more particular systems and the corresponding one or more fault conditions are included in a list of deferrable maintenance tasks, indicate that the aircraft is returned to service and defer maintenance of the aircraft; and
responsive to making a third determination that the aircraft is not returned to service, generate a second checklist display including a second set of incomplete checklist items, wherein the second checklist display is generated based on two or more of the fault code data, the fault context data, the updated state data, and the historical maintenance data, and wherein the second set of incomplete checklist items is different from the first set of incomplete checklist items.

2. The aircraft maintenance system of claim 1, further comprising a display device onboard the aircraft, wherein the display device is configured to display the first checklist display and the second checklist display.

3. The aircraft maintenance system of claim 1, wherein the one or more memory devices store at least a portion of the historical maintenance data.

4. The aircraft maintenance system of claim 1, further comprising a communication interface configured to access at least a portion of the historical maintenance data from a data repository offboard the aircraft.

5. The aircraft maintenance system of claim 1, wherein the fault code data is associated with multiple fault isolation paths, wherein each fault isolation path of the multiple fault isolation paths specifies a sequence of tasks to isolate a cause of a particular fault condition of the one or more fault conditions.

6. The aircraft maintenance system of claim 1, wherein the fault context data comprises sensor data indicating an operational environment associated with the aircraft during the timeframe, configuration data indicating a state of the aircraft during the timeframe, or both.

7. The aircraft maintenance system of claim 1, wherein the historical maintenance data identifies prior maintenance activity associated with the aircraft, associated with one or more other aircraft, or associated with both, and wherein the prior maintenance activity indicates a plurality of historical fault conditions, historical fault context data associated with each of the historical fault conditions, a respective ordered sequence of tasks performed to resolve each of the historical fault conditions.

8. The aircraft maintenance system of claim 1, wherein the state data indicates one or more configuration states of the aircraft.

9. The aircraft maintenance system of claim 1, wherein the instructions are further executable by the one or more processors to cause the one or more processors to, after updating the historical maintenance data, obtain second fault code data and second fault context data via the one or more data bus interfaces, and responsive to the second fault code data matching the fault code data and the second fault context data matching the fault context data, generate a third checklist display including a third set of incomplete checklist items, wherein the third set of incomplete checklist items is different from the first set of incomplete checklist items and is different from the second set of incomplete checklist items.

10. The aircraft maintenance system of claim 1, wherein the input includes one or more data bus signals detected by the one or more data bus interfaces, wherein the one or more data bus signals indicate a configuration state of the aircraft or a change of the configuration state of the aircraft.

11. The aircraft maintenance system of claim 10, wherein the one or more data bus signals are generated responsive to a user changing the configuration state of the aircraft.

12. The aircraft maintenance system of claim 1, wherein generating the second checklist display comprises automatically indicating as complete one or more checklist items of the first set of incomplete checklist items.

13. The aircraft maintenance system of claim 12, wherein the second set of incomplete checklist items includes each checklist item of the first set of incomplete checklist items except the one or more checklist items indicated as complete.

14. The aircraft maintenance system of claim 12, wherein the second set of incomplete checklist items includes one or more checklist items not present in the first set of incomplete checklist items.

15. The aircraft maintenance system of claim 1, wherein the timeframe associated with the one or more fault conditions corresponds to a period before or simultaneous with detection of the one or more fault conditions.

16. A method comprising:
receiving fault code data via one or more aircraft data buses, wherein the fault code data identifies one or more fault conditions detected onboard an aircraft;
receiving fault context data via the one or more aircraft data buses, wherein fault context data indicates one or more conditions of the aircraft in a timeframe associated with the one or more fault conditions;
generating, by one or more processors, a first checklist display including a first set of incomplete checklist items, wherein the first checklist display is generated based on two or more of the fault code data, the fault context data, state data indicating a current state of the aircraft, and historical maintenance data;
receiving, by the one or more processors, input indicating completion of one or more checklist items of the first set of incomplete checklist items;
updating, by the one or more processors, the state data based on the input; and
in response to a first determination that the one or more fault conditions are not cleared:
responsive to isolation of a cause of the one or more fault conditions to one or more particular systems and responsive to a second determination that each of the one or more particular systems and the corresponding one or more fault conditions are included in a list of deferrable maintenance tasks, indicating that the aircraft is returned to service and deferring maintenance of the aircraft; and
responsive to making a third determination that the aircraft is not returned to service, generating, by the one or more processors, a second checklist display including a second set of incomplete checklist items, wherein the second checklist display is generated based on two or more of the fault code data, the fault context data, the updated state data, and the historical maintenance data, and wherein the second set of incomplete checklist items is different from the first set of incomplete checklist items.

17. The method of claim 16, wherein a checklist item of the first set of incomplete checklist items is associated with a task, and wherein the first checklist display further comprises an estimate of a likelihood that performance of the task will resolve the one or more fault conditions.

18. The method of claim 16, wherein each of a plurality of checklist items of the first set of incomplete checklist items is associated with a corresponding task, and wherein the first set of incomplete checklist items are ordered in the first checklist display based on estimates of a likelihood that performance of each of the corresponding tasks will resolve the one or more fault conditions.

19. A non-transitory computer-readable storage medium storing instructions that are executable by one or more processors to cause the one or more processors to perform operations comprising:
receiving fault code data identifying one or more fault conditions detected onboard an aircraft;
receiving fault context data indicating one or more conditions of the aircraft in a timeframe associated with the one or more fault conditions;
generating a first checklist display including a first set of incomplete checklist items, wherein the first checklist display is generated based on two or more of the fault code data, the fault context data, state data indicating a current state of the aircraft, and historical maintenance data;
receiving input indicating completion of one or more checklist items of the first set of incomplete checklist items;
updating the state data based on the input; and
in response to a first determination that the one or more fault conditions are not cleared:
responsive to isolation of a cause of the one or more fault conditions to one or more particular systems and responsive to a second determination that each of the one or more particular systems and the corresponding one or more fault conditions are included in a list of deferrable maintenance tasks, indicating that the aircraft is returned to service and deferring maintenance of the aircraft; and
responsive to making a third determination that the aircraft is not returned to service, generating a second checklist display including a second set of incomplete checklist items, wherein the second checklist display is generated based on two or more of the fault code data, the fault context data, the updated state data, and the historical maintenance data, and wherein the second set of incomplete checklist items is different from the first set of incomplete checklist items.

20. The non-transitory computer-readable storage medium of claim 19, wherein the operations further comprise updating the historical maintenance data based on the input.

* * * * *